(12) United States Patent
Gürtler et al.

(10) Patent No.: US 9,200,113 B2
(45) Date of Patent: Dec. 1, 2015

(54) MULTI-AMINE FUNCTIONAL OLIGOMERS AND METHOD FOR PRODUCING THE SAME BY THE REDUCTION OF CORRESPONDING OXIMES

(75) Inventors: Christoph Gürtler, Köln (DE); Thomas Ernst Müller, München (DE); Ewa Gebauer, Aachen (DE); Henning Vogt, Aachen (DE); Yevgen Berezhanskyy, Lyons (FR); Burkhard Köhler, Zierenberg (DE); Walter Leitner, Aachen (DE)

(73) Assignee: Covestro Deutschland AG (DE)

( * ) Notice: Subject to any disclaimer, the term of this patent is extended or adjusted under 35 U.S.C. 154(b) by 328 days.

(21) Appl. No.: 13/634,148

(22) PCT Filed: Mar. 8, 2011

(86) PCT No.: PCT/EP2011/053411
§ 371 (c)(1),
(2), (4) Date: Nov. 30, 2012

(87) PCT Pub. No.: WO2011/110535
PCT Pub. Date: Sep. 15, 2011

(65) Prior Publication Data
US 2013/0066112 A1    Mar. 14, 2013

(30) Foreign Application Priority Data

Mar. 12, 2010 (DE) .................. 10 2010 011 350
Apr. 29, 2010 (DE) .................. 10 2010 018 785

(51) Int. Cl.
| | | |
|---|---|---|
| C08G 61/04 | (2006.01) | |
| C08G 67/02 | (2006.01) | |
| C08G 64/36 | (2006.01) | |
| C08G 64/42 | (2006.01) | |
| C08G 59/50 | (2006.01) | |
| C08L 63/00 | (2006.01) | |
| C08L 73/00 | (2006.01) | |

(52) U.S. Cl.
CPC ............ *C08G 67/02* (2013.01); *C08G 59/5006* (2013.01); *C08G 61/04* (2013.01); *C08G 64/36* (2013.01); *C08G 64/42* (2013.01); *C08L 63/00* (2013.01); *C08L 73/00* (2013.01)

(58) Field of Classification Search
None
See application file for complete search history.

(56) References Cited

U.S. PATENT DOCUMENTS

| | | | | |
|---|---|---|---|---|
| 2,495,255 | A * | 1/1950 | Hoehn ...................... | 525/539 |
| 2,495,286 | A | 1/1950 | Brubaker | |
| 2,595,225 | A * | 5/1952 | Coffman ................... | 528/392 |
| 2,846,406 | A | 8/1958 | Sinai-Zingde | |
| 3,069,468 | A * | 12/1962 | Cox et al. ................. | 564/459 |
| 3,780,140 | A * | 12/1973 | Hammer et al. ........... | 525/185 |
| 5,300,690 | A * | 4/1994 | Sinai-Zingde ............. | 564/268 |
| 5,952,428 | A | 9/1999 | Yokota et al. | |
| 5,952,438 | A * | 9/1999 | Kratz et al. ............... | 525/471 |
| 6,541,586 | B2 | 4/2003 | Patil et al. | |
| 6,642,328 | B2 * | 11/2003 | Patil et al. ................. | 526/219.6 |
| 6,740,718 | B2 | 5/2004 | Patil et al. | |
| 6,750,278 | B2 | 6/2004 | Patil et al. | |

FOREIGN PATENT DOCUMENTS

| | | | |
|---|---|---|---|
| DE | 19906019 A1 | | 8/2000 |
| EP | 0372602 A2 | | 6/1990 |
| JP | 10-87573 | * | 4/1998 |

OTHER PUBLICATIONS

Computer Translation of JP 10-87573—Apr. 1998.*
International Search Report for PCT/EP2011/053411 mailed Nov. 2, 2011.
Lu, Shui-Yu, et al., "Synthesis and Characterization of Polyketoximes Derived from Alkene-Carbon Monoxide Copolymers", Eur. Polym. Journal, vol. 32(11) 1996, pp. 1285-1288 (XP002661188).
Translation of the International Preliminary Report on Patentabililty for PCT/EP2011/053411 dated Sep. 25, 2012.

* cited by examiner

*Primary Examiner* — Robert C Boyle
(74) *Attorney, Agent, or Firm* — Drinker Biddle & Reath LLP

(57) ABSTRACT

The invention relates to multi-amine functional oligomers and multi-oxime functional oligomers in addition to a method for producing the same by means of the co-polymerization of carbonyl carriers such as olefins or dienes, reaction with hydroxylamine and a subsequent selective catalytic hydrogenation.

4 Claims, No Drawings

MULTI-AMINE FUNCTIONAL OLIGOMERS AND METHOD FOR PRODUCING THE SAME BY THE REDUCTION OF CORRESPONDING OXIMES

CROSS-REFERENCE TO RELATED APPLICATIONS

This application is a national stage application (under 35 U.S.C. §371) of PCT/EP2011/053411, filed Mar. 8, 2011, which claims benefit of German Application No. 10 2010 011 350.6, filed Mar. 12, 2010, and German Application No. 10 2010 018 785.2, filed Apr. 29, 2010, all of which are incorporated herein by reference in their entirety.

The present invention relates to multi-amine functional oligomers which can be synthesized by free-radical copolymerization of carbon monoxide with olefins, subsequent reaction of the keto groups with hydroxylamine to form oximes and subsequent reduction to form amines.

Multi-amine functional oligomers are interesting reaction partners, e.g. for isocyanates or epoxides. Molecules which contain more than two amine groups are interesting crosslinkers which, together with amine-reactive compounds, such as polyisocyanates or polyepoxides, can be linked to form three-dimensional networks. For controlling the reactivity, the primary amino groups can also be reacted with maleic esters to form aspartic esters, or with ketones or aldehydes to form ketamines or aldimines. In addition, the amine groups can be reacted with phosgene to form isocyanates. These multi-isocyanate functional oligomers are likewise interesting polymer building blocks.

To date, only what are termed Jeffamines are synthesizable. Jeffamines are polyoxyalkyleneamines, polyethers which contain primary amine groups at the end of the polyether backbone. The ether groups impede a reaction with phosgene to form isocyanates, since the HCl liberated breaks down the ether groups. In addition, the ether groups are susceptible to photodegradation.

Therefore, the synthesis of multi-amine functional oligomers is desirable, the amine groups of which are situated on a purely aliphatic hydrocarbon backbone. Such products have not been described to date. In addition, the molecular weight ($M_n$) and the glass temperature ($T_g$) should be so low that the multi-amine functional oligomers have viscosity as low as possible. There are various reactions for introducing amine groups into molecules. One of these is the reduction, preferably hydrogenation, of oximes to amines, wherein the oximes can be synthesized from the corresponding ketones by reaction with hydroxylamine. A systematic investigation from JACS (1956) 78, 860-861 shows that the hydrogenation of simple oximes over Raney cobalt or Raney nickel is less selective with respect to the ratio of primary to secondary amines. For multi-functional oligomeric oximes this is particularly critical, since, on the occurrence of secondary amines, oligomer chains are linked, which can lead to an undesirable increase in molecular weight up to complete crosslinking. In addition, secondary amines do not react with phosgene to form isocyanates, but to form carbamoyl chlorides, the chlorine of which then remains in the oligomer. Selectivities with respect to primary amines that are observed for the hydrogenation of low-molecular-weight oximes are insufficient for multi-oxime functional oligomers. Hydrogenation of molecules which contain two or more oxime groups to give the corresponding primary amines has not been described to date.

It is known that carbon monoxide and olefins are polymerizable to form polyketones. The free-radical copolymerization is described in Progress of Polymer Science (1997) 22, 1547-1605 or in U.S. Pat. No. 6,750,278, U.S. Pat. No. 6,541,586, U.S. Pat. No. 6,740,718 or U.S. Pat. No. 6,642,328. The possibility of reacting polyketones synthesizable by free-radical polymerization with hydroxylamine to form polyoximes has been mentioned in U.S. Pat. No. 2,495,286.

The object of the present invention was to synthesize multi-amine functional oligomers that have a low fraction of secondary amino groups and which have as little as possible advancement due to formation of secondary amino groups.

Surprisingly, it has now been found that such products are synthesizable by hydrogenation of multi-oxime functional oligomers. The oligomers that are to be hydrogenated can be obtained, for example, by free-radical copolymerization of carbon monoxide with olefins and subsequent reaction with hydroxylamine.

The invention relates to a method for producing multi-amine functional oligomers, characterized in that first
carbon monoxide and at least one olefin are copolymerized by a free-radical mechanism,
the carbonyl groups of the resultant copolymers are then reacted with hydroxylamine to form multi-oxime functional oligomers,
and the multi-oxime functional oligomers are then reduced to multi-amine functional oligomers.

The invention also relates to a method for producing multi-amine functional oligomers, characterized in that multi-oxime functional oligomers are hydrogenated.

The invention further relates to the multi-amine functional oligomers obtainable by the two methods described.

The invention also relates to a method corresponding to the last-mentioned method, wherein the multi-oxime functional oligomers that are to be used are compounds of the following formula 1:

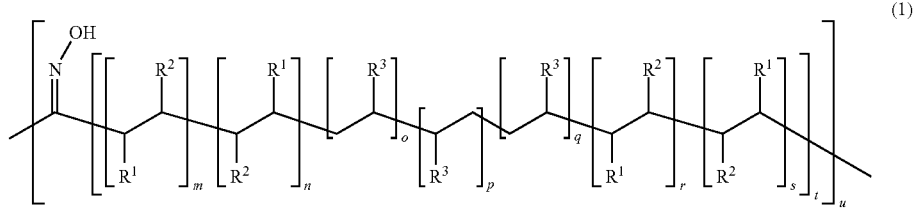

wherein
$R^1$=Me, Et, n-Pr, i-Pr, n-Bu, i-Bu, n-pentyl, i-pentyl, neopentyl, hexyl, heptyl, octyl, Ph, 3-$CH_3C_6H_4$ or 4-$CH_3C_6H_4$,
$R^2$=H, Me, Et, n-Pr, i-Pr, n-Bu, i-Bu, n-pentyl, i-pentyl, neopentyl, hexyl, heptyl, octyl, Ph, 3-$CH_3C_6H_4$ or 4-$CH_3C_6H_4$,
$R^3$=H or Me,
wherein m, n, o, p, q, r, s=0 to 400
and m+n+o+p+q+r+s=1 to 400 and t=1 to 100
and u=2 to 250
or
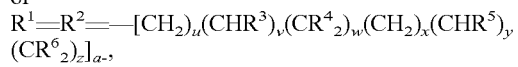
wherein u, v, w, x, y, z=0 to 6; u+v+w+x+y+z=3 to 6; a=3 to 6
and $R^3$ and m, n, o, p, q, r, s, t, u have the meaning stated above,
and the individual structural units t and u within the oligomers can differ with respect to the parameters m, n, o, p, q, r and/or s.

The expression multi-oxime functional oligomers also includes mixtures of oligomers of the formula 1.

The invention further relates to multi-amine functional oligomers of the formula 2:

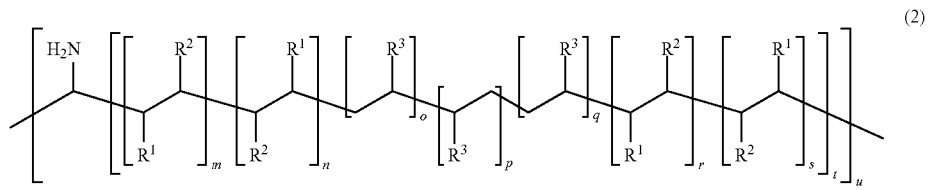

wherein
$R^1$=Me, Et, n-Pr, i-Pr, n-Bu, i-Bu, n-pentyl, i-pentyl, neopentyl, hexyl, heptyl, octyl, Ph, 3-$CH_3C_6H_4$ or 4-$CH_3C_6H_4$,
$R^2$=H, Me, Et, n-Pr, i-Pr, n-Bu, i-Bu, n-pentyl, i-pentyl, neopentyl, hexyl, heptyl, octyl, Ph, 3-$CH_3C_6H_4$ or 4-$CH_3C_6H_4$,
$R^3$=H or Me,
wherein m, n, o, p, q, r, s=0 to 400
and m+n+o+p+q+r+s=1 to 400
and t=1 to 100
and u=2 to 250
or
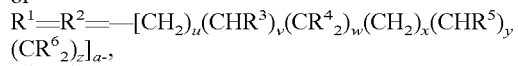
wherein u, v, w, x, y, z=0 to 6; u+v+w+x+y+z=3 to 6; a=3 to 6
and $R^3$ and m, n, o, p, q, r, s, t, u have the meaning stated above,
and the individual structural units t and u within the oligomers can differ with respect to the parameters m, n, o, p, q, r and/or s.

The expression multi-amine functional oligomers also includes mixtures of oligomers of the formula 2.

In a preferred embodiment, olefin mixtures are used that contain
A) an olefin selected from the group consisting of ethylene and propylene or a mixture of propylene and ethylene and
B) at least one higher terminal olefin and/or at least one higher internal olefin.

Higher terminal or internal olefins for the purposes of the invention are, e.g. 1-butene, 2-butene, butadiene, the isomers of pentene, hexene, heptene, octene, isooctene, nonene, decene, undecene, dodecene, higher terminal or internal alkenes, styrene, alpha-methylstyrene, 3- and/or 4-methylstyrene.

In a particularly preferred embodiment, olefin mixtures are used that contain
A) ethylene and
B) at least one higher terminal olefin and/or at least one higher internal olefin.

The copolymerization is initiated by free-radical initiators such as azo compounds or peroxides, preferably azo compounds. 0.01 to 50% by weight, preferably 0.1 to 30% by weight, particularly preferably 0.1 to 3% by weight of free-radical initiators are used, based on the monomers. The copolymerization proceeds at temperatures such that the half-life of the initiators used is in the range 1 min to 1 h. The reaction is preferably carried out at a temperature of 50 to 250° C., preferably 70 to 180° C. The reaction temperature depends on the decomposition temperature of the starter used and is at least thereabove. The temperatures when 2,2'-azobis(4-methoxy-2,4-dimethylvaleronitrile) is used are preferably 30 to 140° C., when 2,2'-azobis(2,4-dimethylvaleronitrile) is used, preferably 50 to 160° C., when 2,2'-azobis(2-methylbutyronitrile) is used, preferably 70 to 180° C. In the case of the particularly preferably used azodiisobutyronitrile, the temperatures are preferably 70 to 130° C. In the case of gaseous or low-boiling monomers, the procedure is carried out under pressure. When ethylene and/or propylene are used in the olefin mixture, the partial pressure of ethylene is preferably between 10 and 2000 bar, particularly preferably between 30 and 100 bar, and the partial pressure of CO is between 1 and 30% of the partial pressure of ethylene. The copolymerization can proceed in the presence or absence, preferably in the absence, of solvents. Suitable solvents are, inter alia, tetrahydrofuran, methylcyclohexane or pentane.

The molecular weight can be set via the amount of the free radical initiator used and/or by adding a suitable regulator, such as hydrogen or mercaptans, and suitable choice of the reaction conditions such as temperature and partial pressure.

For the formation of the multifunctional oximes, hydroxylamine is used in one to ten times the molar amount, based on the carbonyl groups. Preferably, hydroxylamine is used as aqueous solution or without solvent. However, it can also be liberated in situ from salts of hydroxylamine, such as hydrochloride or sulfate, in aqueous or alcoholic solution with bases. The reaction of the multi-carbonyl functional oligomers with hydroxylamine can be carried out in a two-phase mixture. Preferably, a two-phase mixture which is formed from the multi-carbonyl functional oligomer or a solution of the multi-carbonyl functional oligomer in an inert solvent such as benzene, toluene, chlorobenzene or chloroform and the aqueous hydroxylamine solution is used. In addition, solvents that are at least partially water-soluble and inert to hydroxylamine, such as methanol, ethanol, isopropanol, n-propanol, n-butanol, dioxane, THF, DMF, NMP or dimethylacetamide can be used as solubilizers. The reaction is carried out at temperatures of 0 to 100° C., preferably 15 to 40° C. Then, the multifunctional oxime can be isolated by phase separation and/or distilling off the volatile components of the reaction mixture.

The invention also relates to a method for producing multi-oxime functional oligomers, characterized in that copolymers obtainable by free-radical copolymerization of carbon monoxide with ethylene and/or propylene and also one or more higher terminal or internal olefins such as 1-butene, 2-butene, butadiene, pentene, hexene, heptene, octene, isooctene, nonene, decene, undecene, dodecene or higher terminal or internal alkenes, styrene, alpha-methylstyrene, 3- and/or 4-methylstyrene are reacted with hydroxylamine to form multi-oxime functional oligomers.

The invention also relates to multi-oxime functional oligomers obtainable by this method.

The multi-oxime functional oligomers are reduced by a suitable reducing agent, preferably molecular hydrogen, using a selective homogeneous or heterogeneous hydrogenation catalyst. The hydrogenation with hydrogen proceeds at temperatures of 20 to 200° C., preferably 80 to 180° C., particularly preferably 120 to 160° C., at pressures of 10 to 200 bar, preferably 10 to 100 bar, particularly preferably 10 to 50 bar in the presence of 0.1 to 20% by weight of hydrogenation catalyst, such as cobalt, nickel, ruthenium, rhodium, palladium, iridium, platinum. The catalysts can be used as Raney catalysts or on suitable supports. Preferably, Raney cobalt, Raney nickel, or supported cobalt, nickel or ruthenium catalysts are used. Suitable support materials are particularly carbon and oxides such as silicon dioxide, aluminum dioxide, mixed oxides of silicon dioxide and aluminum dioxide, and also titanium oxide. Preferably, the hydrogenation is carried out in the presence of ammonia, particularly preferably in an equimolar amount, based on oxime groups. The hydrogenation can be carried out in the presence or absence of solvents. Suitable solvents are THF, dioxane or $C_1$-$C_4$ alcohols. Other reducing agents are alkali metals or hydrides, alanates or boranates thereof.

If nitrile-containing free-radical initiators such as azodiisobutyronitrile, or 2,2'-azobis(4-methoxy-2,4-dimethylvaleronitrile) are used, then nitrile groups incorporated into the polymer can likewise be reduced to primary amine groups under the conditions of oxime reduction and contribute to the functionality of the multi-amine functional oligomers according to the invention.

If alkene groups or aryl groups are present in the multi-oxime functional oligomers, these can likewise be reduced under the conditions of oxime reduction.

The multi-amine functional oligomers according to the invention have a molecular weight $M_n$ of 500 to 20 000, preferably 800 to 8000 g/mol. The multi-amine functional oligomers contain at least 2, and on average 3 to 20, amine groups, preferably 3 to 10 amine groups. The amine number, corresponding to the amount of KOH in mg which is equivalent to the amine fraction contained in one g of substance, is 8 to 967, preferably 20 to 120. The ratio of primary to secondary amine groups is at least 7:3, preferably at least 9:1, particularly preferably at least 19:1.

The multi-functional oximes that are to be used have a molecular weight $M_n$ of 500 to 20 000, preferably 800 to 8000 g/mol. The multi-oxime functional oligomers contain at least 2, and on average 3 to 20, oxime groups, preferably 3 to 10 oxime groups. The oxime equivalent is 71 to 6700, preferably 500 to 2800 g/eq.

The multi-amine functional oligomers according to the invention are particularly highly suitable as reaction partners for isocyanates and epoxides, as starting materials for the phosgenation to form multi-isocyanate functional oligomers and for producing elastic coatings or shaped bodies. The secondary products with dialkyl esters of maleic acid (polyaspartates) and with ketones or aldehydes (polyketamines or polyaldimines) are particularly suitable as reaction partners for polyisocyanates.

The invention also therefore relates to the use of the multi-amine functional oligomers according to the invention as reaction partners for isocyanates and epoxides, as starting materials for the phosgenation to form multi-isocyanate functional oligomers and for the production of elastic coatings or shaped bodies.

EXAMPLES

The CO content of the polyketones was determined from integrating the signals obtained in the corresponding $^1$H NMR spectrum. The $^1$H NMR spectra were measured at 400 MHz in $CDCl_3$ using a Bruker AV400. The chemical shifts were calibrated relative to the solvent signal ($CDCl_3$, $\delta$=7.26 ppm).

The $^1$H NMR signals of the polyketones were assigned as follows: $\delta$=2.6 (CO—$\underline{CH}^{\alpha}_2$—$\underline{CH}^{\alpha}_2$—CO, Integral A), 2.4 (CO—$\underline{CH}^{\alpha'}_2$—$(CH_2)_{\geq 2}$, Integral B), 1.7 (CO—$CH_2$—C$\underline{H}^{\beta}_2$—$CH_2$+C($\underline{CH}^{AIBN}_3$)$_2$CN+C—$\underline{CH}^{Hex}(C_4H_9)$—C, Integral C), 1.2 (($CH_2$)$_2$—($\underline{CH}^{ali}_2$)—($CH_2$)$_2$, Integral D), 0.8 ($\underline{H}^{Hex'}_3C(CH_2)_3$, Integral E) ppm.

The CO content of the polyketones was determined with appropriate correction for the content of AIBN fragments $C(CH^{AIBN}_3)_2CN$ and n-butyl side chains (of 1-hexene) from the integrals A, B, C, D and E via the following calculations for the relative molar content n:

$$n(CO)=[n(CH^{\alpha}_2)+n(CH^{\alpha'}_2)]/2=(A/2+B/2)/2=(A+B)/4$$

$$n(CH^{\alpha}_2)=A/2$$

$$n(CH^{\alpha'}_2)=B/2$$

$$n(CH^{\beta}_2)=n(CH^{\alpha'}_2)=B/2$$

$$n(CH^{Hex})=n(H_3C(CH_2)_3)=E/3$$

$$n(CH^{AIBN}_3)=(C-B-E/3)/6$$

$$n(CH^{ali}_2)=D/2$$

$$n(CH^{Hex'}_3)=E/E$$

After multiplication of the relative molecular content n of the individual groups by the respective molecular weight M thereof (where M(CO)=28 g/mol, M($CH_3$)=15 g/mol, M($CH_2$)=14 g/mol, M(CH)=13 g/mol, M(C($CH_3$)$_2$CN)=68 g/mol), this gives, for the CO content:

$$CO \text{ content} = $$
$$28 * n(CO) / \{28 * n(CO) + 14 * \Sigma[n(CH^{\alpha}_2)] + 13 * n(CH^{Hex}) + 15 *$$
$$n(CH^{Hex'}_3) + 68 * n(CH^{AIBN}_3)\} =$$
$$7(A+B)/[14A+21B+13E/3+34(C-B-E/3)/3+7D+5F]$$

The nitrogen content was determined by means of CHN elemental analysis on a Vario EL.

$M_n$ and $M_w$ were determined by gel permeation chromatography (GPC) on a SECurity GPC system from PSS Polymer Service against polystyrene standards (THF as eluent for polyketones and polyoximes, 0.1% DEAEA in THF for polyamines; flow rate 1.0 ml/min; columns: 2×PSS SDV linear S, 8×300 mm, 5 nm; RID detector; BHT as internal standard).

Viscosities were determined using an MCR 51 rheometer from Anton Paar (measurement system: cone-plate principle; heating range 23-60° C., heating rate 0.1° C./s, shear rate 250/s (constant); measuring cone: CP 25.1 (25 mm diameter), cone angle: 1°).

The glass transition temperatures (Tg) were determined using a DSC Pyris 6 from Perkin Elmer. Heating method: (−70)° C. (3 min)-(+10)° C./min-(+180)° C.-(−10)° C./min-(−70)° C. (3 min)-(+10)° C./min-(+180)° C.

Example 1

Production of an Ethylene-Hexene-Carbon Monoxide Copolymer 50 ml of hexene, 50 ml of methylcyclohexane and 1 g of AIBN were charged into a 200 ml pressure reactor. 50 bar ethylene, 10 bar carbon monoxide and 20 bar hydrogen were charged under pressure and the mixture was heated for 18 h at 80° C. The product, after filtration and removal of the volatile components on a rotary evaporator, was obtained as a colorless to yellow oil.

Experiment 1
  Yield: 5.3 g
  CO content=7.1% by weight
  Elemental analysis: nitrogen content=2.91%
  GPC analysis: $M_n$=1301 g/mol, $M_w$=2272 g/mol, $D(M_w/M_n)$=1.75

Experiment 2
  Yield: 3.4 g
  CO content=9.9% by weight
  Elemental analysis: nitrogen content=4.49%
  GPC analysis: $M_n$=992 g/mol, $M_w$=1559 g/mol, $D(M_w/M_n)$=1.57

Experiment 3
  Yield: 3.4 g
  CO content=9.7% by weight
  Elemental analysis: nitrogen content=3.5%
  GPC analysis: $M_n$=1106 g/mol, $M_w$=1792 g/mol, $D(M_w/M_n)$=1.62

Example 2

Production of the Polyoxime from Polyketone According to Example 1

Experiment 1
4.3 g of the polyketone according to example 1, experiment 1 were admixed with 4.3 g of a 50 percent strength solution of hydroxylamine in water and 50 ml of THF and the mixture was stirred for 4 h under reflux. The reaction mixture was admixed with 30 ml of dichloromethane, shaken, and the phases were separated. After drying over MgSO$_4$ and clarification with activated carbon, the organic phase was concentrated on a rotary evaporator. This produced 4.1 g of polyoxime.
  Elemental analysis: nitrogen content=5.95%
  GPC analysis: $M_n$=1339 g/mol, $M_w$=2256 g/mol, $D(M_w/M_n)$=1.68

Experiment 2
2.1 g of the polyketone according to example 1, experiment 2 were admixed with 2.2 g of a 50 percent strength solution of hydroxylamine in water and 50 ml of THF and the mixture was stirred for 4 h under reflux. The reaction mixture was admixed with 30 ml of dichloromethane, shaken, and the phases were separated. After drying over MgSO$_4$, the organic phase was concentrated by rotary evaporation. This produced 1.86 g of product. Since, according to NMR, unreacted keto groups were still present, 1.66 g of the product were again reacted under the same conditions with 1.7 g of a 50 percent strength solution of hydroxylamine in water. After workup, this produced 1.2 g of polyoxime.
  Elemental analysis: nitrogen content=8.52%
  GPC analysis: $M_n$=1008 g/mol, $M_w$=1515 g/mol, $D(M_w/M_n)$=1.50

Experiment 3
3.4 g of the polyketone according to example 1, experiment 3, were admixed with 0.98 g of a 50 percent strength solution of hydroxylamine in water and 50 ml of THF and the mixture was stirred for 4 h under reflux. The reaction mixture was admixed with 30 ml of dichloromethane, shaken, and the phases were separated. After drying over MgSO$_4$, the organic phase was concentrated by a rotary evaporator. This produced 2.97 g of polyoxime.
  Elemental analysis: nitrogen content=7.1%
  GPC analysis: $M_n$=1109 g/mol, $M_w$=1749 g/mol, $D(M_w/M_n)$=1.58

Example 3

Production of the Polyamine from Polyoxime According to Example 2

Experiment 1
50 ml of a 0.5 n solution of ammonia in dioxane, 200 mg of Raney nickel and 3.5 g of polyoxime according to example 2, experiment 1 were charged into a 200 ml pressure reactor. 40 bar hydrogen were introduced under pressure and the mixture was hydrogenated for 4 h at 140° C. After filtering off the Raney nickel and washing with THF, the filtrate was concentrated by rotary evaporation. This produced 3.4 g of polyamine
  Elemental analysis: nitrogen content=5.06%
  GPC analysis: $M_n$=1363 g/mol, $M_w$=2477 g/mol, $D(M_w/M_n)$=1.82
  Viscosity (23° C.): 20580 mPa·s
  $T_g$<−70° C.

Experiment 2a
30 ml of a 0.5 n solution of ammonia in dioxane, 40 mg of Raney nickel and 0.61 g of polyoxime according to example 2, experiment 2 were charged into a 200 ml pressure reactor. The mixture was heated to 140° C., then 40 bar of hydrogen were introduced under pressure and the mixture was hydrogenated for 4 h at 140° C. After filtering off the Raney nickel and washing with THF, the filtrate was concentrated on a rotary evaporator. This produced 0.64 g of polyamine
  Elemental analysis: nitrogen content=7.59%
  GPC analysis: $M_n$=976 g/mol, $M_w$=1580 g/mol, $D(M_w/M_n)$=1.62
  Viscosity (23° C.): 40320 mPa·s
  $T_g$<−70° C.

Experiment 2b
30 ml of a 0.5 n solution of ammonia in dioxane, 40 mg of Raney nickel and 0.46 g of polyoxime according to example 2, experiment 2 were charged into a 200 ml pressure reactor. 40 bar hydrogen were introduced under pressure and the mixture was hydrogenated for 4 h at 140° C. After filtering off the Raney nickel and washing with THF, the filtrate was concentrated on a rotary evaporator. This produced 0.46 g of polyamine
  Elemental analysis: nitrogen content=7.30%
  GPC analysis: $M_n$=967 g/mol, $M_w$=1555 g/mol, $D(M_w/M_n)$=1.61
  Viscosity (23° C.): 34180 mPa·s
  $T_g$<−70° C.

A comparison of experiments 2a and 2b shows that it is not critical for the product properties whether hydrogen is added at room temperature and the reaction mixture is then heated to reaction temperature, or whether hydrogen is added after reaction temperature is reached.

Experiment 3

30 ml of a 0.5 n solution of ammonia in dioxane, 40 mg of Raney nickel and 0.87 g of polyoxime according to example 2, experiment 4 were charged into a 200 ml pressure reactor. 40 bar hydrogen were introduced under pressure and the mixture was hydrogenated for 4 h at 140° C. After filtering off the Raney nickel and washing with THF, the filtrate was concentrated on a rotary evaporator. This produced 0.71 g of polyamine Elemental analysis: nitrogen content=6.1%
GPC analysis: $M_n$=1084 g/mol, $M_w$=1814 g/mol, $D(M_w/M_n)$=1.67
Viscosity (23° C.): 41570 mPa·s
$T_g$<−70° C.

A comparison of the molecular weight of polyamine and polyoxime shows that the selectivity with respect to primary amines in the oxime hydrogenation is very good, since the formation of secondary amines by linking of polymer chains would lead to a considerable increase in molecular weight.

Comparative Example 1

Production of an Ethylene-Carbon Monoxide-Copolymer 100 ml of methylcyclohexane and 1 g of AIBN were charged into a 200 ml pressure reactor. 50 bar ethylene, 10 bar carbon monoxide and 10 bar hydrogen were introduced under pressure and the mixture was heated for 8 h at 80° C. After expansion to atmospheric pressure, a solid-liquid mixture was obtained.

By filtration, 3.27 g of a waxy solid were isolated.
GPC analysis: $M_n$=1800 g/mol, $M_w$=2824 g/mol, $D(M_w/M_n)$=1.57

By removing the volatile components of the filtrate on the rotary evaporator, 1.38 g of an oily solid were additionally obtained.

GPC analysis: $M_n$=805 g/mol, $M_w$=1191 g/mol, $D(M_w/M_n)$=1.48

The example shows that the copolymerization of ethylene and carbon monoxide, in comparison with the copolymerization of ethylene, 1-hexene and carbon monoxide, leads to a more inhomogeneous product with solid polymer components.

Comparative Example 2

Effect of the Steric Requirement on the Selectivity of the Hydrogenation of Oximes A mixture of 7.5 g of the oxime according to table 1, 175 ml of THF and 750 mg of Raney nickel were charged into a 200 ml pressure reactor and 40 bar of hydrogen were introduced under pressure at 140° C. After 135 min, the reactor was cooled to room temperature and depressurized. Raney nickel was filtered off and the filtrate was analyzed by gas chromatography. The results are summarized in table 1.

TABLE 1

Model study for the hydrogenation of monofunctional oximes

| Substrate | Selectivity [%] | | Conversion rate [%] |
| --- | --- | --- | --- |
| | Primary amine | Secondary amine | |
| (straight-chain aldoxime) | 73.1 | 26.9 | 100 |
| (2-ethylhexyl aldoxime) | 79.4 | 20.6 | 100 |
| (cyclohexylmethyl aldoxime) | 87.5 | 12.5 | 100 |
| (pivaldehyde oxime) | 97.7 | 2.3 | 100 |
| (ketoxime) | 98.5 | — | 100 |

TABLE 1-continued

Model study for the hydrogenation of monofunctional oximes

| | Selectivity [%] | | |
| Substrate | Primary amine | Secondary amine | Conversion rate [%] |
| --- | --- | --- | --- |
| 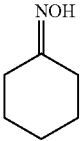 | 81.8 | 18.2 | 100 |

The experiments on model substrates make it clear that sterically demanding oximes are hydrogenated in relatively high selectivity to give the primary amine. Furthermore, the experiments make it clear that linear ketoximes are hydrogenated to give the primary amine in a higher selectivity than linear aldoximes.

Comparative Example 3

Effect of Ammonia on the Selectivity of the Hydrogenation of Oximes

A mixture of 7.5 g of 2-ethylbutanaldoxime, 175 ml of THF, 395 mg of a 28 percent strength aqueous ammonia solution and 750 mg of Raney nickel were charged into a 200 ml pressure reactor and 40 bar of hydrogen were introduced under pressure at 140° C. After 135 min, the reactor was cooled to room temperature and depressurized. Raney nickel was filtered off and the filtrate analyzed by GC. 1-amino-2-ethylbutane was obtained as the sole product.

From the comparison with the example from table 1, entry 2, it is clear that the selectivity of the hydrogenation of oximes over Raney nickel to give primary amines is considerably increased from 79.4% to >99% by addition of 1 equivalent of ammonia.

The invention claimed is:

1. A method for producing a multi-amine functional oligomer, comprising
    copolymerizing carbon monoxide and at least one olefin by a free-radical mechanism to form a copolymer which comprises at least one carbonyl group,
    reacting the at least one carbonyl group of the resultant copolymer with hydroxylamine to form a multi-oxime functional oligomer, and
    reducing the multi-oxime functional oligomer to a multi-amine functional oligomer;
    wherein the reduction proceeds by hydrogenation using molecular hydrogen and wherein the hydrogenation proceeds in the presence of ammonia.

2. The method as claimed in claim 1, wherein the at least one olefin is an olefin mixture comprising
    A) an olefin selected from the group consisting of ethylene, propylene, and mixtures thereof, and
    B) at least one further terminal and/or internal olefin different from A).

3. The method as claimed in claim 2, wherein component (A) is ethylene.

4. The method as claimed in claim 2, wherein component (B) is selected from the group consisting of 1-butene, 2-butene, butadiene, the isomers of pentene, hexene, heptene, octene, isooctene, nonene, decene, undecene, dodecene, styrene, alpha-methylstyrene, 3-methylstyrene, 4-methylstyrene, and mixtures thereof.

* * * * *